Nov. 9, 1954 K. SCHUMACHER 2,693,736
PROCESS CAMERA FOCUSING MECHANISM
Filed Oct. 17, 1951 2 Sheets-Sheet 1
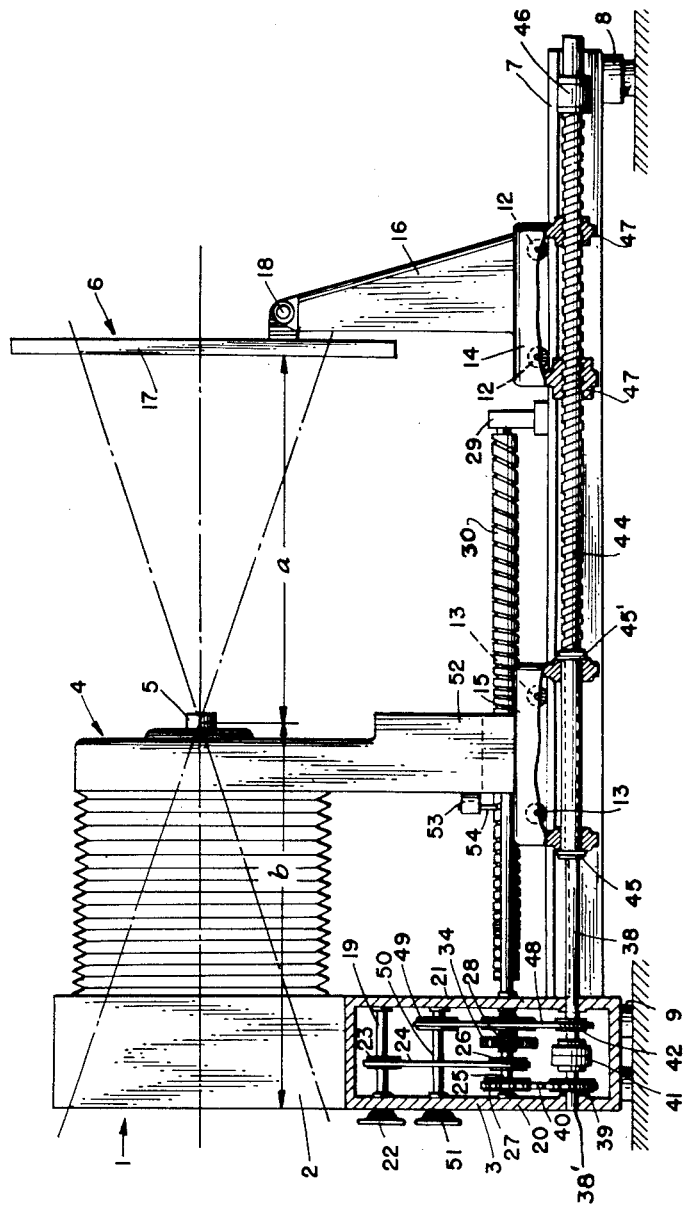
INVENTOR:
KARL SCHUMACHER
BY
ATT'YS Nov. 9, 1954  K. SCHUMACHER  2,693,736
PROCESS CAMERA FOCUSING MECHANISM
Filed Oct. 17, 1951  2 Sheets-Sheet 2
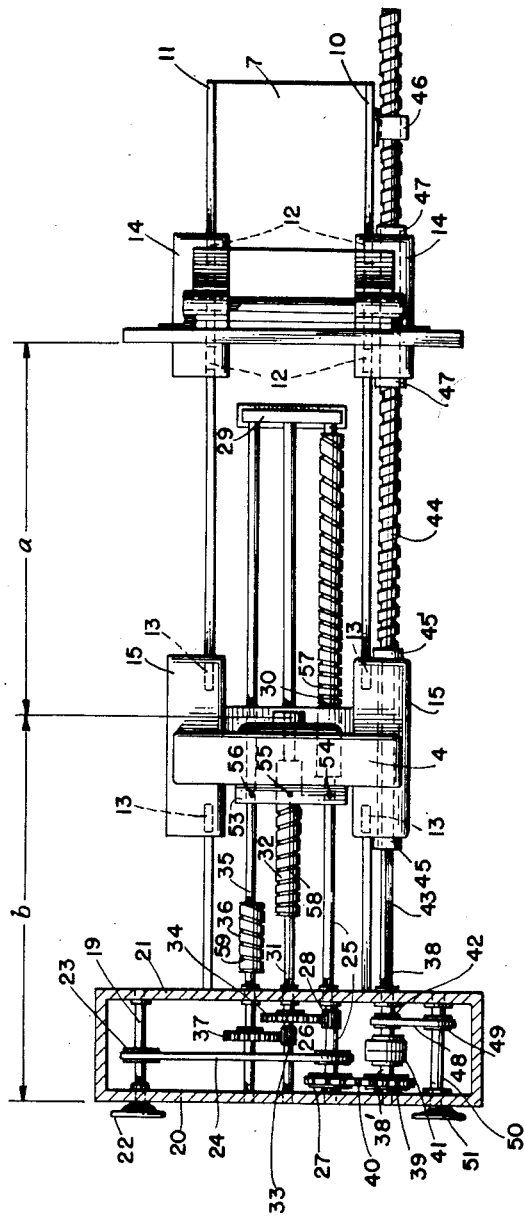
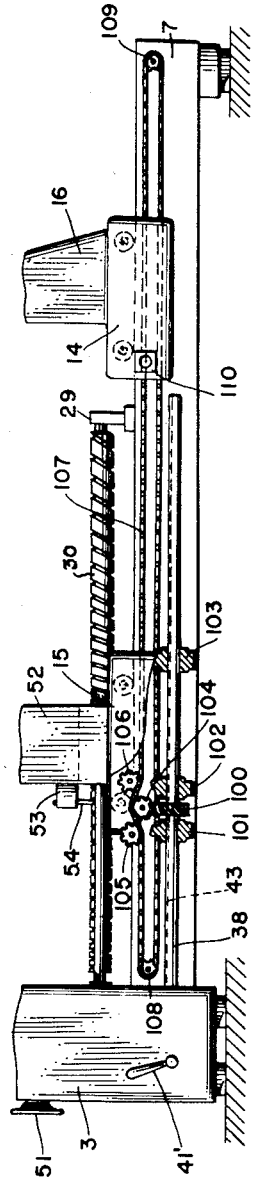
*INVENTOR:*
KARL SCHUMACHER
BY
*Rummler, Rummler & Snow*
ATT'YS United States Patent Office 2,693,736
Patented Nov. 9, 1954

2,693,736

PROCESS CAMERA FOCUSING MECHANISM

Karl Schumacher, Frankfurt am Main, Germany

Application October 17, 1951, Serial No. 251,652

11 Claims. (Cl. 88—24)

This invention relates to improvements in automatic camera focusing devices.

The main objects of this invention are to provide a new and improved mechanism for automatically focusing a process camera; to provide a new and improved focusing mechanism which automatically and accurately fixes the proper distance between the copy holder, lens, and negative holder for either copying, reducing or enlarging the copy to be photographed, regardless of the relative proportions desired, throughout the entire range of the camera capacity; to provide a process camera having relatively movable negative holder and lens-carrying frames operated by a series of successively and automatically engageable differential drive members actuated simultaneously at relatively different speeds; to provide, such a device having a fixed negative holder and positively driven movable lens and copy holders operated by a single drive mechanism, whereby the lens and copy holder movements are relatively synchronized and automatically correlated to fix the proper distance between each of them and the negative holder, throughout the entire enlarging and reducing range of the camera; and to provide a device of this character which includes a supplementary mechanism for adjusting the focal distance between the lens and the copy holder to automatically compensate for variations in the distance between the plane of the copy being photographed and the plane of the copy holder.

An illustrative embodiment of this invention is shown in the accompanying drawings in which:

Figure 1 is a side view of a process camera embodying the present invention, parts being shown in section and parts shown broken away.

Fig. 2 is a top plan view of the device of Fig. 1 with parts being shown in section.

Fig. 3 is a side view, similar to Fig. 1, but showing a modified form of the mechanism for shifting the copy holder component of the camera.

Referring in detail to the drawings, the process camera shown includes a negative holder 1, mounted in a suitable housing 2 which is integrally formed on a fixed transmission housing 3 containing a series of gears and pulleys hereinafter described; a movable lens housing 4, provided with a lens 5, which is axially aligned with the center of the negative holder; and a movable copy holder 6 axially aligned with the lens 5. The negative holder 1 is of the usual commercial construction and therefore, the same is not shown in detail.

The copy holder 6 and the lens housing 4 are both mounted on a bed or frame 7, one end of which is welded or otherwise integrally secured to housing 3. The other end of the bed 7 and the housing 3 are each provided with suitable feet 8 and 9 whereby the bed 7 lies in a horizontal plane while the housing 3 and the negative holder extend vertically above the bed 7.

The bed 7 is also provided with a pair of longitudinal tracks 10 and 11 located on its upper surface, each adjacent one side of the same, along which the copy holder 6 and the lens holder 4 are arranged to ride on antifriction rollers 12 and 13 respectively. The rollers 12 and 13 are journaled on shafts which are in turn suitably mounted in the base members 14 and 15, respectively, on which the copy holder and lens holder are respectively mounted.

The copy holder 6 is provided with a vertically extending support 16, integrally formed on the base 14, on which the copy board 17 is pivotally secured, as at 18. The lens housing 4 is also integrally formed on the base 15 and carries the lens 5 at a fixed elevation above the bed 7 and aligned with the center of the negative holder 1.

The transmission housing 3 is provided with a main drive shaft 19, journaled in the side walls 20—21 thereof, having a drive wheel 22 and a pulley 23 which is provided with a belt 24 for driving a first driven shaft 25 through pulley 26. As shown in Fig. 2, the shaft 25 is journaled in the side walls 20—21 of the transmission housing, parallel with the main shaft 19, and carries a sprocket wheel 27 and a pinion gear 28; also the shaft 25 extends forwardly through the wall 21, parallel with the bed 7, and into a bearing block 29 mounted on the bed 7, between the rails 10 and 11, adjacent its forward end. A variable pitch spindle or differential screw 30 is fixedly mounted coaxially on the outboard end of the shaft 25 so as to extend rearwardly from the bearing block 29.

A second driven shaft 31, positioned alongside the shaft 25, is also journaled in the housing side walls 20—21 and the bearing block 29 and carries a second variable pitch screw or spindle 32, located so that the forward end of the spindle 32 slightly overlaps the rearward end of the first spindle 30. Shaft 31, on the portion inside the housing 3, also carries a pinion gear 33, identical with the pinion gear 28, and a large gear 34 which meshes with the pinion gear 28 to drive the shaft 31 directly from the shaft 25.

A third driven shaft 35 is journaled in the housing side walls 20—21 and bearing block 29 and carries a third variable pitch spindle or screw 36, the forward end of which is located so as to slightly overlap spindle 32. The shaft 35 also carries a large gear 37 which meshes with the pinion 33, whereby it is driven directly from the shaft 31 upon operation of the shaft 25.

The three above-mentioned driven shafts 25, 31 and 35, are all disposed in a common plane, parallel with and above the plane of the bed 7, and the three variable pitch spindles or screws 30, 32 and 36, each of which is at a fixed distance from the housing wall 21, are of equal diameter. These elements comprise the principal drive members for imparting motion to the lens holder 4 through its base 15; and the overlapping and staggered position of the spindles, relative to each other, provides the means for obtaining a uniform and positive drive of the lens holder through an extremely wide range of continuously varying speeds, as will be hereinafter explained.

As shown, a fourth driven shaft 38 is also provided for driving the copy holder 6 and its base 14 simultaneously with any movement of the lens holder 4. The shaft 38 has its rear end journaled in the housing wall 21, at an elevation below the surface of the bed 7, and this shaft extends forwardly from the housing 3, along one side of the bed 7, and through the corresponding side of the lens holder base 15. The rear end of the shaft 38 extends into the housing 3 and is axially aligned with a stub-shaft 38' journaled in the housing wall 20. The stub-shaft 38' carries a drive sprocket 39, which is connected by a pitch chain 40 with the sprocket 27 on the shaft 25, and also carries one-half of a clutch 41. The other half of the clutch 41 is mounted fast on the rear end of the shaft 38 and the two clutch parts are normally drivingly engaged so that upon rotation of the shaft 25, the shaft 38 is also driven by the sprockets 27—39, and the chain 40. The rear end of the shaft 38, within the housing 3, also carries a pulley 42 by means of which it can be independently driven, as will be explained.

The forwardly extending portion of the shaft 38 is formed with a longitudinal spline 43 which in turn, has a sliding connection with a keyway, not shown, formed in the inner wall of a tubular screw or spindle 44, mounted in and extending forwardly from the lens holder base 15. The rear end of the spindle 44 is connected to the lens holder base 15 by means of end collars 45—45' which are fast on the spindle 44 and bear, rotatively, against respective ends of the base 15. The forward end of the spindle 44 is slidably journaled in a bearing 46, mounted at the forward end of the bed 7 and along its length the spindle is provided with an external screw thread of a constant predetermined pitch.

As shown, the spindle 44 extends through the copy holder base 14 and the base 14 is provided with a pair of fixed nuts 47, one at each end of the base, which have threaded connection with the spindle 44. Thus, since the spindle 44 is rotatively attached to the lens holder base 15, any rotation of the fourth shaft 38 will drive the spindle 44, through the sliding connection made by the spline 43, and simultaneously move the copy holder base 14 relative to the lens holder base 15. Also, since the spindle 44 is carried by the lens holder base 15, any movement of the lens holder 4, relative to the negative holder housing 2, will be transmitted to the same extent and immediately to the copy holder. In this manner the distance relationship of the copy holder and lens holder will at all times be kept in proper proportion with the distance between the lens holder and the negative holder, regardless of whether the lens holder is positioned for enlarging or reducing, and the exact relationship of the three components to each other will be maintained automatically over the full range of operation of the device through a single common drive from the main shaft 19.

Manual drive of the shaft 38, to adjust the initial relation of the copy holder to the lens holder so as to compensate for thickness or offset of the copy from the plane of the copy holder, may be accomplished independently of the main drive shaft 19. This is done by the pulley 42 on shaft 38, a belt 48, and the pulley 49 fast on a shaft 50 which is suitably journaled in the housing side walls 20—21. The shaft 50 extends through the housing wall 21 and a handwheel 51 is mounted on the projecting end. By disengaging the clutch 41, rotation of the shaft 38, by manipulation of the handwheel 51, may be readily accomplished without disturbing the lens holder-negative holder relation. Operation of the clutch 41 is accomplished by any suitable means, not shown, actuated by a lever 41' on the end of the housing 3. (See Fig. 3.)

The spaced base members 15, which ride on the rails 10—11, are integral or rigidly connected parts of the lower portion 52 of the lens holder 4, which portion bridges the spindles 30, 32 and 36 and carries a rearwardly projecting support block 53, rigidly fixed to said portion 52 and overhanging the several spindles. The block 53 carries a series of rigid downwardly projecting follower fingers 54—55—56 and each follower finger is aligned with the axis of a respective spindle and is of such length as to engage in the respective one of the cam grooves or threads 57—58—59 with which the variable pitch spindles 30—32—36 are provided. It is by means of the engagement of the follower members, or fingers, in the cam grooves of the spindles 30, 32 and 36, that the principal adjustment and control of the apparatus is accomplished.

The principal functions of an automatic focusing mechanism for cameras comprising a negative holder, a lens, and a copy holder, is to maintain a predetermined distance relation of the three components automatically for any desired condition of enlargement or reduction, at the negative holder, of an image carried by the copy holder. As will be understood by those skilled in the art, the distance relationship which must be maintained between the three components must conform to the focusing or lens formula $$\frac{1}{a}+\frac{1}{b}=\frac{1}{f}$$

where, as shown in Figs. 1 and 2, "a" represents the distance of the object from the plane of the main point of the lens which faces toward the object, "b" represents the distance of the image from the plane of the main point of the lens which faces toward the negative holder, and "f" represents the focal length of the lens.

Mechanical adjustment of the distances "a" and "b," for either enlargement or reduction of the image, by means of a variable pitch screw or a differential screw, is a common practice and in all such cases the variation or change of pitch, as the screw thread progresses axially of the driving spindle on which it is formed, is calculated to impart motion to the movable components of the apparatus in accordance with the before-mentioned formula.

In the past, however, the practical range of operability of the variable pitch or differential screw driving means has been extremely limited because of the very rapid change of pitch of the screw thread which the focusing formula necessitates, and as a result the range of enlargement and the range of reduction obtainable has been so much less than that demanded by usual practices in the field of graphic arts as to necessitate the construction of photographic apparatus with a plurality of separate drive systems, each requiring a manual operation for transferring the drive of the movable components from one drive system to another.

Thus, heretofore focusing apparatus could not be practically built which would provide for a continuous adjustment over a large range on both sides of the medial or 1:1 position of the components, where the distances "a" and "b" are equal.

If, for example, the distance "a" of the copy holder from the lens, is changed at a constant rate, the increase or decrease of the pitch of the driving thread for adjusting the corresponding distances "b," between the negative holder and the lens, must vary according to the square of the extent of copy holder movement required for the desired enlargement or reduction. Thus an adjustment range of, for example, 1:10 on reduction to 3:1 on enlargement, as is necessary in practice, ought to have a progressive pitch on the driving screw for adjusting the distance between the lens and the negative holder in the ratio of 1:900. From a practical standpoint this would be impossible with screws running at the same speed, or with a single screw, because the screw diameter would have to be too great, for any reasonable construction or utility, in order to provide sufficient metal between the threads of smaller pitch to carry the load of the camera components to be moved.

By my present invention I have solved this problem by providing a drive for one of the movable components of the camera system which operates that component at a constant lineal speed and providing an automatic transfer, multiple section, drive for the other movable component of the system which operates such other component at a constantly varying lineal speed over the entire range of the camera system capacity. Thus I am enabled to construct a process camera capable of automatic precision focusing continuously from a minimum of reduction to a maximum of enlargement without any need for manual shift or change from one drive system to another at various stages in the camera capacity range.

In the specific embodiment of my invention herein shown and described the camera system is of the type wherein the negative holder 1, together with its housing 2, is stationary and the movable components are the lens holder 4 and the copy holder 6. In this arrangement I prefer to drive the copy holder at a constant lineal speed and to apply the variable speed drive to the lens only, for adjustment of its distance "b" from the negative holder. Therefore, to conform the movement of both the lens and copy to the focusing formula I connect the copy holder 6 directly to the lens holder 4 and drive the copy holder with relation to the lens holder only, so that any movement of the lens holder is automatically compensated for in the total amount of lineal movement required for the copy holder. As shown in Figs. 1 and 2, this is accomplished by fixing the screw 44 to the lens holder base 15 by the bearings 45 and 45' and providing the spline connection between the drive shaft 38 and the screw 44. The screw 44, in turn, is provided with a constant pitch thread so that the copy holder base will be moved a uniform predetermined distance relative to the lens holder upon each revolution of the drive shaft 38.

In the construction of the variable speed drive, for adjusting the distance "b" between the lens and the negative holder, the variable pitch spindles or differential screws 30, 32 and 36 are designed to move the lens a predetermined varying distance, toward or away from the negative holder, for each constant increment of movement of the copy holder away from or toward the lens. This requires such a rapid change of pitch in the adjusting screw threads, particularly in the reducing range of the camera, where the distance "b" is decreasing, that according to ordinary procedures, the physical dimensions of the driving screw determine an arbitrary limit for the range of reduction that might be had in a practical device. Also the fact that the maximum pitch or inclination of the threads must be in the order of 45 to 50 degrees, from a normal to the screw axis, to obtain precision adjustment; and the fact that, in the region of minimum pitch, sufficient metal must remain between the grooves to support the load of the lens holder and its carriage, are limiting factors which materially reduce the movement range for which a screw may be designed.

However, in the form of the invention herein shown, I have solved these problems by utilizing the three differential screws 30, 32 and 36, to cover the total distance that the lens must be moved relative to the negative holder in order to provide the desired operative range for the camera, which screws act successively to drive the lens holder and operate at respectively different rotative speeds.

The first or main spindle or screw 30 is driven by its shaft 25 at the same speed as the copy holder drive screw 44 and is formed and positioned to drive the lens holder over the enlarging range of the camera where the distance "b" is varied at a rapid rate relative to the uniform increments of change in the distance "a." The second spindle or screw 32 is driven by its shaft 31 at approximately one-tenth the speed of the shaft 25, through the pinion 28 and the gear 34, and is formed and positioned to cover the camera range of from slightly more than 1:1 to a reduction of 1:3. The third spindle 36 is driven by its shaft 35, through the pinion 33 and gear 37, at approximately one-tenth the speed of the spindle 32, and is formed and positioned to cover the lower end of the reduction range where the rate of change of the distance "b," relative to change in the distance "a," is the smallest. Thus I am able to keep the screw diameter to a practical size, for example 2", and at the same time keep a sufficient pitch in the screw threads as to provide ample metal between the threads for carrying the load of the lens holder which is transmitted by the follower pins 54, 55 and 56.

The variable pitch of the threads on the several drive screws is calculated according to the actual tested focal length of the particular lens to be used in the camera; the reason being that, due to manufacturing tolerances, each lens is actually of a different focal length than that for which it is designed. Thus, with the screw 44 predetermined to provide a constant amount of change for the distance "a," between the lens and the copy, for each revolution of the shaft 38, the progressive change of pitch of threads on the screws 30, 32 and 36, is determined by the respective shaft speeds and the focusing formula $$\frac{1}{a}+\frac{1}{b}=\frac{1}{f}$$

This manner of calculating such variable pitch threads is well known in the art and need not be further explained.

In the modification shown in Fig. 3, like numerals indicate the like parts shown in Figs. 1 and 2. The modification illustrates another manner for automatically shifting the copy holder with respect to the lens holder upon any change of the lens holder-negative holder relationship. It employs the same shaft 38 and spline 43, for delivering power from the transmission housing 3, but instead of the constant pitch screw or spindle of the first embodiment, I employ a chain drive to accomplish the same result.

As shown the modified copy holder drive comprises a worm wheel 100, slidably mounted on the spline shaft 38, and held between bearings 101—102, integrally formed on the rear end portion of the base 15 of the lens holder 4. The free or outboard end of shaft 38 is supported by another bearing 103 integral on the front end of the base 15. The worm 100 is operatively associated with a chain drive gear 104, journaled in the base 15 on an axis normal to the axis of the shaft 38, and a pair of idler gears 105—106 lying in the same plane as the gear 104 are journaled in the base 15 on each side of drive gear 104. An endless chain 107, running between freely rotatable sprockets 108 and 109, located at opposite ends respectively of the bed 7, is threaded between the drive gear 104 and the idler gears 105—106 and this chain provides the means for a driving connection between the copy holder and the lens housing. The copy holder 6 is attached to the chain in any suitable manner, such as by a clamp block 110. Thus any shifting of the lens holder will result in identical shifting of the copy holder, through a dragging of the chain by the lens holder, and relative movement of the copy holder with respect to the lens holder will occur to the exact extent that the chain is driven by the worm 100.

As shown, the spindles 30, 32 and 36 are disposed so as to slightly overlap each other endwise, and the pitch of the threads in the overlapping portions of the several spindles is designed, according to the relative spindle speeds, so that the rate of advance of the overlapping threads is the same. Also, the thread grooves are carried through the end walls of each spindle and the spindles are positioned on their respective shafts so that as one follower pin approaches the end of the spindle by which it is being driven, the next succeeding follower pin will feed precisely into the entrance of the groove on the next succeeding spindle. In this manner the transfer of the drive for the lens housing from one spindle to another is automatic and the movement of the lens housing throughout its entire range of movement is precisely in accordance with the focusing formula.

As shown in the drawings, the position of the lens holder 4 is such that the lens is equidistant from the negative holder and the copy board. That is, the distances "b" and "a" are equal, and the follower pin 55, which is engaged in the groove or thread 58 of the spindle 32, is approaching the forward end of the spindle. The spindle 32 is proportioned to provide a range adjustment from a 1:3 reduction to approximately a 1.1:1 enlargement. The spindle 30 is designed to provide a range of adjustment for enlargement from 1.1:1 to 3.6:1, and the spindle 36 is proportioned to provide a reduction range of from 1:3 to 1:10. Thus with the device illustrated, the total range of the camera is from 1:10 reduction to 3.6:1 enlargement with precisely accurate and continuous adjustment over the entire range.

It will be understood by those skilled in the art that the drive for the improved camera focusing mechanism may be actuated by an electric motor connected to the main drive shaft 10, through a suitable reduction gear, and that such electric motor may be provided with control means whereby the drive may be accurately stopped at any predetermined position. Such electric drive and control for the improved camera apparatus is not shown since the practice is common in the art and several suitable electric drive means are known and available.

The main advantages of this invention reside in the arrangement of the drive for the movable components of the camera mechanism, whereby precise adjustment of the components relative to each other in accordance with the lens formula may be obtained continuously over the entire range of the camera capacity; and in the arrangement of the drive mechanism whereby the focusing curve is distributed over a plurality of variable pitch spindles or differential screws, each rotating at a different speed than the others, so that the sizes of the driving screws can be kept within practical bounds and at a minimum. Further advantages of this invention reside in the arrangement whereby one of two movable components of the camera is operated at a constant speed while the other is operated at a varying speed, so that a variable drive for only one of the movable components is required. And still further advantages reside in the adaptability of the invention to electric drive, whereby full automatic focusing over the entire camera range may be obtained from a single point of centralized control.

Although but two specific embodiments of this invention have been herein shown and described, it will be understood that details of the constructions shown may be altered or omitted without departing from the spirit of this invention as defined by the following claims.

I claim:

1. An automatic focusing mechanism for photographic apparatus comprising a negative holder element and lens holder element one of which is movable relative to the other, said focusing mechanism comprising a plurality of rotatable differential screws mounted on one of said elements, said screws extending parallel with the axis of movement between said elements and being arranged one in advance of the other in fixed axially spaced relation, each of said screws having a continuously varying pitch thread running from a maximum pitch to a minimum pitch in a common axial direction, the other of said elements having follower means fixed thereto for driving engagement with said screws successively, means to drive said screws simultaneously and each at a predetermined different speed, the relative speeds of said screws decreasing progressively in the same axial direction that the screw thread pitch decreases, a copy holder element aligned with the focal axis of said lens holder element and axially spaced therefrom, and means for varying the focal axis distance between said copy holder element and said lens holder element at a constant predetermined rate during operation of said screws.

2. An automatic focusing mechanism for photographic apparatus comprising negative holder, lens, and copy holder elements one of which is fixed, said mechanism comprising a constant speed drive connected between the lens element and one of the other elements for changing the distance relationship between the same, a continuously variable drive connected between the lens element and the third element for changing the distance relationship between the same, the last named drive consisting of a continuously varying pitch screw thread distributed upon a plurality of axially spaced spindles each rotating at a different predetermined speed, said thread leading from one spindle to another in continuous predetermined timed relation, said constant speed drive being mounted on and in fixed relation with one of the two first named elements, and said variable drive being mounted on and in fixed relation with one of the two last named elements, follower means fixed on the other of the last named elements and having operative engagement with said thread, and means to operate said constant speed drive and said variable drive simultaneously and in predetermined timed relation with each other.

3. An automatic focusing mechanism for photographic apparatus comprising negative holder, lens, and copy holder elements, two of which elements are movable relative to each other and the third element which is fixed, said focusing mechanism comprising rotary drive means for shifting one of said movable elements a constant predetermined distance for each revolution of said drive means, a plurality of differential screw members for shifting the other movable element relative to the fixed element at a predetermined progressively changing rate during operation of said drive means, said screw members being mounted on and extending from one of the last named elements in axial spaced relation to each other, each of said screw members having a continuously varying pitch thread running maximum pitch to minimum pitch in an axial direction common to all said screw members, a follower means fixed to said other of the last named elements for driving engagement with said screw members successively, and means for operating said driving means and said differential screw members simultaneously and in fixed timed relation with each other, the last named means including means for maintaining a constant different speed relation between each screw member and the other screw members, and said follower means being adapted to lead uninterruptedly from one screw member to another.

4. An automatic focusing mechanism for photographic apparatus comprising negative holder, lens, and copy holder elements, said lens and copy holder elements being shiftable relative to said negative holder and to each other along a common axis, said mechanism comprising a constant speed drive directly connecting said lens and copy holder elements for changing the distance relationship between said elements, a continuously variable drive extending between said negative holder and lens elements for changing the distance relationship between the lens and the negative holder, the last named drive consisting of a continuously varying pitch screw thread distributed upon a plurality of axially spaced spindles each rotating at a different predetermined speed, said thread leading from one spindle to another in continuous predetermined relation, said variable speed drie being fixedly mounted with respect to said negative holder, said lens holder having follower means mounted thereon for operatively engaging the screw threads on said spindles successively, and means to operate said constant speed drive and said variable speed drive simultaneously and in predetermined timed relation with each other.

5. In a process camera comprising negative holder, lens, and copy holder components, two of which components are movable relative to each other and the third component which is fixed, a focusing mechanism comprising rotary driving means for shifting one of said movable components a constant predetermined distance for each revolution of said driving means, a plurality of parallel differential screw members for shifting the other movable component relative to the fixed component at a predetermined progressively changing rate during operation of said driving means, said screw members being mounted on one of the last named components in axially spaced relation to each other, a plurality of follower means fixed to said other of the last named components each for engaging with a respective one of said screw members individually, said screw members and the respective followers being spaced to coact successively in continuous operation, and means for operating said driving means and said differential screw members simultaneously and in fixed timed relation with each other, the last named means including means for maintaining a constant different speed relation between each screw member and the other screw members.

6. An automatic focusing device for process camera as having a bed, a fixed negative holder, a movable lens holder, a movable copy holder and a transmission, a constant pitch rotatable hollow screw secured at one end to said lens holder and slidably supported at the other end on said bed, means on said copy holder having driving connection with said hollow screw, a plurality of parallel driving spindles each provided with a continuously varying pitch thread traveling from end to end of the spindle, the pitch of the threads of said spindles decreasing in a common axial direction, shafts for each of said spindles driven by said transmission, said transmission driving each of said shafts at a different relative speed, said spindles being spaced apart axially along said bed beneath said lens holder with their adjacent ends overlapping, downwardly projecting follower pins fixed on said lens holder, one for each of said spindles, for engaging the threads of said spindles respectively at successive predetermined positions of said lens holder relative to said transmission, and means in said transmission for driving said hollow screw and said driving spindles simultaneously.

7. An automatic focusing device for process cameras having a bed, a fixed negative holder, a movable lens holder, a movable copy holder and a transmission, a constant pitch rotatable hollow screw secured at one end to said lens holder and slidably supported at the other end on said bed, means on said copy holder having driving connection with said hollow screw, a plurality of parallel driving spindles each provided with a continuously varying pitch thread traveling from end to end of the spindle, the pitch of the threads of said spindles decreasing in a common axial direction, shafts for each of said spindles driven by said transmission, said transmission driving each of said shafts at a different relative speed, said spindles being spaced apart axially along said bed beneath said lens holder with their adjacent ends overlapping, downwardly projecting follower pins fixed on said lens holder, one for each of said spindles, for engaging the threads of said spindles respectively at successive predetermined positions of said lens holder relative to said transmission, and means in said transmission for driving said hollow screw and said driving spindles simultaneously, said transmission including means to rotate said hollow screw independently of the last named drive means.

8. In a photographic apparatus having a plate holder element, a lens holder element, and a copyholder element, a drive mechanism for shifting one of said elements relative to another of said elements at a continuously varying speed along a common axis comprising a plurality of rotatable differential screws mounted on one of the elements, said screws extending from the one element toward the other element parallel with the axis of movement between said elements and being arranged one in advance of the other in fixed axially spaced relation, each of said screws having a continuously varying pitch thread running from maximum pitch to minimum pitch in a common axial direction, follower means fixed on said other element for driving engagement with said screws successively, means for driving said screws simultaneously and each at a predetermined different speed, and means for driving the third element relative to said one element at a constant speed during movement of said other element.

9. In a photographic apparatus having a plate holder element, a lens holder element, and a copyholder element, a drive mechanism for shifting one element of said apparatus relative to another element thereof at a continuously varying speed along a common axis comprising a plurality of rotatable differential screws mounted on one of the elements and extending toward the other parallel with said common axis and each other, said screws being arranged one in advance of the other in fixed axially spaced relation, each of said screws having a continuously varying pitch thread running from maximum pitch to minimum pitch in a common axial direction, the other element having a plurality of followers fixed thereto each for driving engagement with a respective one of said differential screws, said followers being positioned on the last mentioned element so that said followers will engage their respective screws successively, means for driving said screws simultaneously and each at a predetermined different speed, and means for driving the third of said elements relative to said one element at a constant speed during movement of said other element.

10. In a photographic apparatus having a plate holder element, a lens holder element, and a copyholder element, a drive mechanism for shifting one element of said apparatus relative to another thereof at a continuously varying rate along a common axis comprising a plurality of rotatable differential screws mounted on one of the elements and extending toward the other parallel with said common axis, said screws being arranged one in advance of the other in fixed axially spaced relation with their adjacent ends overlapping, each of said screws having a continuously varying pitch thread running from maximum pitch to minimum pitch in a common axial direction, the other element having a plurality of followers fixed thereto for driving engagement with respective ones of said differential screws, said followers being disposed on the last mentioned element so that each will engage with its respective screw in succession with respect to the operation of the other followers, means for driving said screws simultaneously and each at a predetermined different speed, and means for driving the third of said element relative to said one element at a constant speed during movement of said other element.

11. In a photographic apparatus having a plate holder element, a lens holder element, and a copyholder element, a varying speed drive mechanism for shifting one element of said apparatus relative to another thereof at a continously changing rate along a common axis comprising a plurality of rotatable differential screws mounted on one of the elements and extending toward the other parallel with said common axis, said screws being arranged one in advance of the other and in fixed axially spaced relation, each of said screws having a continuously varying pitch thread running from maximum pitch to minimum pitch in a common axial direction, the other element having a plurality of followers fixed thereto for driving engagement with respective ones of said differential screws, said followers being disposed on the last mentioned element so that each will engage its respective screw in succession relative to the other followers, means for driving said screws simultaneously and each at a predetermined speed, and means for driving the third of said elements relative to said one element at a constant speed during movement of said other element.

No references cited.